United States Patent
Barford

(10) Patent No.: US 7,864,711 B2
(45) Date of Patent: Jan. 4, 2011

(54) RANK ORDER FILTERING FOR RANDOMLY SAMPLED DATA POINTS

(75) Inventor: Lee A. Barford, San Jose, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 959 days.

(21) Appl. No.: 11/688,582

(22) Filed: Mar. 20, 2007

(65) Prior Publication Data
US 2008/0232249 A1 Sep. 25, 2008

(51) Int. Cl.
H04L 12/28 (2006.01)
H04J 3/06 (2006.01)

(52) U.S. Cl. ........................ 370/255; 370/516
(58) Field of Classification Search ......... 370/250–255, 370/503, 516, 517
See application file for complete search history.

(56) References Cited

U.S. PATENT DOCUMENTS

| | | | | |
|---|---|---|---|---|
| 7,072,921 B2 * | 7/2006 | Kim | ........................ | 708/207 |
| 7,072,928 B2 * | 7/2006 | Kim | ........................ | 708/304 |
| 7,173,945 B1 * | 2/2007 | Liu et al. | ........................ | 370/516 |
| 7,260,593 B2 * | 8/2007 | Kim | ........................ | 708/304 |
| 2002/0186681 A1 * | 12/2002 | Martin | ........................ | 370/350 |

OTHER PUBLICATIONS

Barford, Lee; "Filtering of Randomly sampled, Time-Stamped Measurements"; IMTC 2006—Instrumentation and Measurement Technology Conference; Apr. 24-27, 2006; pp. 1-6; Sorrento, Italy.
Barford, Lee; "Fourier Analysis of Time-Stamped Signals Using a Small Number of Samples"; IMTC 2006— Instrumentation and Measurement Technology conference; Apr. 24-27, 2006; pp. 1-5; Sorrento, Italy.
Ferreira, Paulo J. S. G. ; "Sorting Continuous-Time Signals and the Analog Median Filter"; IEEE Signal Processing Letters; Oct. 2000; pp. 281-283; vol. 7, No. 10.
Barford, Lee; "Finite Impulse Response Filter for a Time-Synchronized System"; Agilent Technologies, Inc. U.S. Appl. No. 11/298,246; pp. 1-27.
Barford, Lee; "Non-Uniform Sampling to Avoid Aliasing"; Agilent Technologies, Inc. U.S. Appl. No. 11/554,402; pp. 1-11.
Barford, Lee; "Method and Apparatus of Spectral Estimation"; Agilent Technologies, Inc. U.S. Appl. No. 11/229,479; pp. 1-39.

* cited by examiner

Primary Examiner—Hong Cho

(57) ABSTRACT

A method of rank order filtering and a rank order filter apparatus is defined by an established rank order and accepts into a buffer, data points to be filtered, each data point having a data value and an associated time stamp. Data points are accepted until the buffer contains data points representing a minimum predefined time span. The filter calculating an amount of time the data values in the buffer are above an approximate filter value and adjusts the approximate filter value based upon the relationship of the amount of time to the rank order. The steps iterate to approach a value defined by the rank order and the approximate filtered value is output.

25 Claims, 7 Drawing Sheets

RANK ORDER FILTERING FOR RANDOMLY SAMPLED DATA POINTS

BACKGROUND

Data collection networks often sample data at a first location and then transmit the sampled data to another location for processing and analysis. In some data collection networks, data may be sampled randomly or irregularly as a function of time. In particular, a time interval between individual samples of a continuously time-varying signal may vary essentially randomly as a function of time.

Examples of such data collection networks include, but are not limited to, a wideband test system with random sampling and a time synchronized, low power network of sensors. A wideband test system with random sampling, when accompanied by accurate timestamping (e.g., time synchronization) of the samples, facilitates wideband signal characterization using average sample rates far below a conventional Nyquist sampling rate for the signal. In another wideband signal test situation, particular tests often require accurate data across limited spectral range (e.g., one-tone and two-tone tests of radio frequency devices). In such situations, randomized data sampling may minimize a total amount of data required for performing the tests. With respect to low-power networked sensors, a power consumption of each sensor is often directly related to a sample rate of the sensor. In many situations, reducing the data rate by employing randomized sampling facilitates low-power operation. In addition, constraints imposed by the network (e.g., network protocols and associated timing) often place practical restrictions on sampling intervals resulting in uneven or irregularly spaced samples. U.S. Pat. No. 6,735,539 B2 to Barford, incorporated herein by reference, teaches such a system using networked sensors with unevenly spaced samples having timestamps.

Median filtering is known by those of ordinary skill in the art as a non-linear digital filter technique suitable for continuously time-varying signals that is useful for purposes of removing noise in the data and signal smoothing. The median filter identifies an amplitude value wherein half of the time the data is above the median amplitude value and half of the time the data is below the median amplitude value.

A rank order filter is a more general filter based on the median filter concept wherein a percentage p between 0% and 100% may be selected. A rank order filter returns the amplitude value where p % of the data is below the returned amplitude value and (100−p) % of the data is equal to or above the returned amplitude value.

Publication entitled "Sorting Continuous-Time Signals and the Analog Median Filter", authored by Paulo J. S. G. Ferreira published in the IEEE Signal Processing Letters, Vol. 7, No. 10, in October 2000, proposes a solution to median and rank order filtering in terms of distribution and rearrangement of data in a continuously time-varying function and analog filtering. While rank order analog filtering is a helpful discussion, there remains a practical solution for a digital median and rank order filter suitable for use on data sampled at random intervals of time.

BRIEF DESCRIPTION OF THE DRAWINGS

An understanding of the present teachings can be gained from the following detailed description, taken in conjunction with the accompanying drawings of which like reference numerals in different drawings refer to the same or similar elements.

DETAILED DESCRIPTION

In the following detailed description, for purposes of explanation and not limitation, example embodiments disclosing specific details are set forth in order to provide an understanding of embodiments according to the present teachings. However, it will be apparent to one having ordinary skill in the art having had the benefit of the present disclosure that other embodiments according to the present teachings that depart from the specific details disclosed herein remain within the scope of the appended claims. Moreover, descriptions of well-known apparatus and methods may be omitted so as to not obscure the description of the example embodiments. Such methods and apparatus are clearly within the scope of the present teachings.

Figure 1:
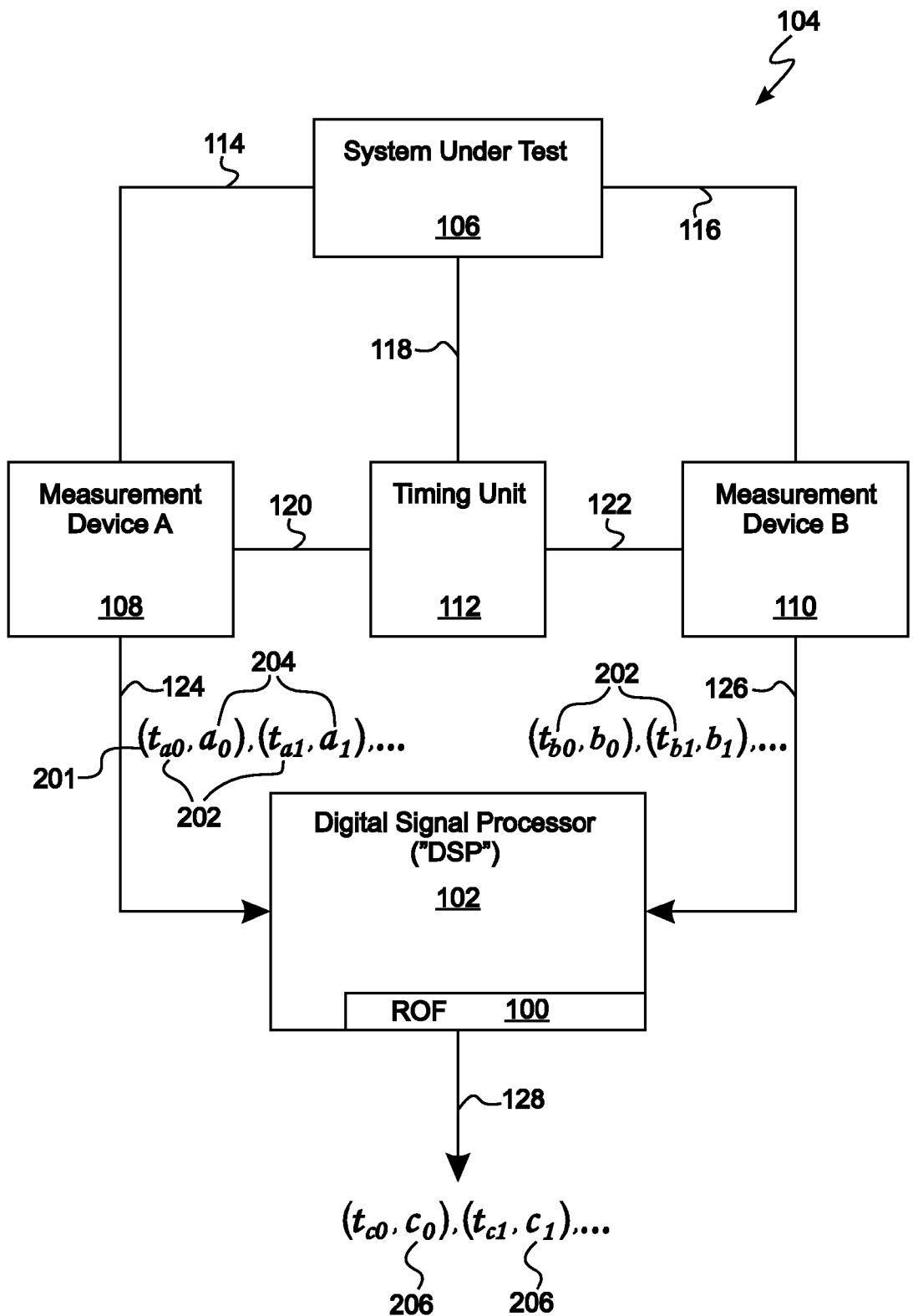
FIG. 1 is a simplified block diagram of an embodiment of a rank order filter 100 according to the present teachings that is implemented within a controller.

An approach for implementation of a rank order filter for a time-synchronized system is described. The time-synchronized system may be a time-synchronized measurement system, time-synchronized control system, or both. With specific reference to FIG. 1 of the drawings, a block diagram of an example of an implementation of a rank order filter 100 that is implemented within a controller, such as Digital Signal Processor ("DSP") 102 is shown within a test system 104 where the measurements of the test system 104 are time-synchronized. As an example, the test system 104 may include a system under test 106 (also known as a device under test "DUT"), measurement devices (such as, for example, measurement device A 108 and measurement device B 110), and a timing unit 112. In this example, the system under test 106 may be in signal communication with measurement device A 108, measurement device B 110, and timing unit 112 via signal paths 114, 116, and 118, respectively. Additionally, the timing unit 112 may be in signal communication with both the measurement device A 108 and measurement device B 110 via signal paths 120 and 122, respectively. The DSP 102 may also be in signal communication with both the measurement device A 108 and measurement device B 110 via signal paths 124 and 126, respectively.

One of ordinary skill in the art appreciates that the system under test 106 may be an individual component or a combination of components making up a system. Additionally, the measurement device A 108 and measurement device B 110 may be each an individual test measurement unit, such as, for example, a signal analyzer, a digital voltage meter, a temperature sensor, or other electrical or signal measurement device.

The system under test 106, measurement device A 108 and measurement device B 110 may be time synchronized to the timing unit 112 via signal paths 118, 120, and 122, respectively. As an example, the timing unit 112 may utilize IEEE 1588 precision time protocol. In this example, the measurement device A 108 may generate measurements "$a_0$" at time "$t_{a0}$", "$a_1$" at time "$t_{a1}$", etc. Similarly, the measurement device B 110 may generate measurements "$b_0$" at time "$t_{b0}$", "$b_1$" at time "$t_{b1}$", etc. These measurements are time synchronized in that they have an associated time stamp normalized against a reference clock, but they are not triggered at uniform time intervals and may not be triggered at the same time. The reference clock, therefore, establishes the placement of the measurements in time.

The output of measurement devices A 108 and B 110 is collected at the DSP 102, via signal paths 124 and 126, respectively. In other implementations, the output may be stored in memory accessed by DSP 102. The DSP 102 then implements a plurality of instructions for the rank order filter 100. The output of the rank order filter 100 along signal path 128, i.e., ($t_{c0}$, $c_0$), ($t_{c1}$, $c_1$), etc., is then available for further processing, analysis, or display.

Figure 2:
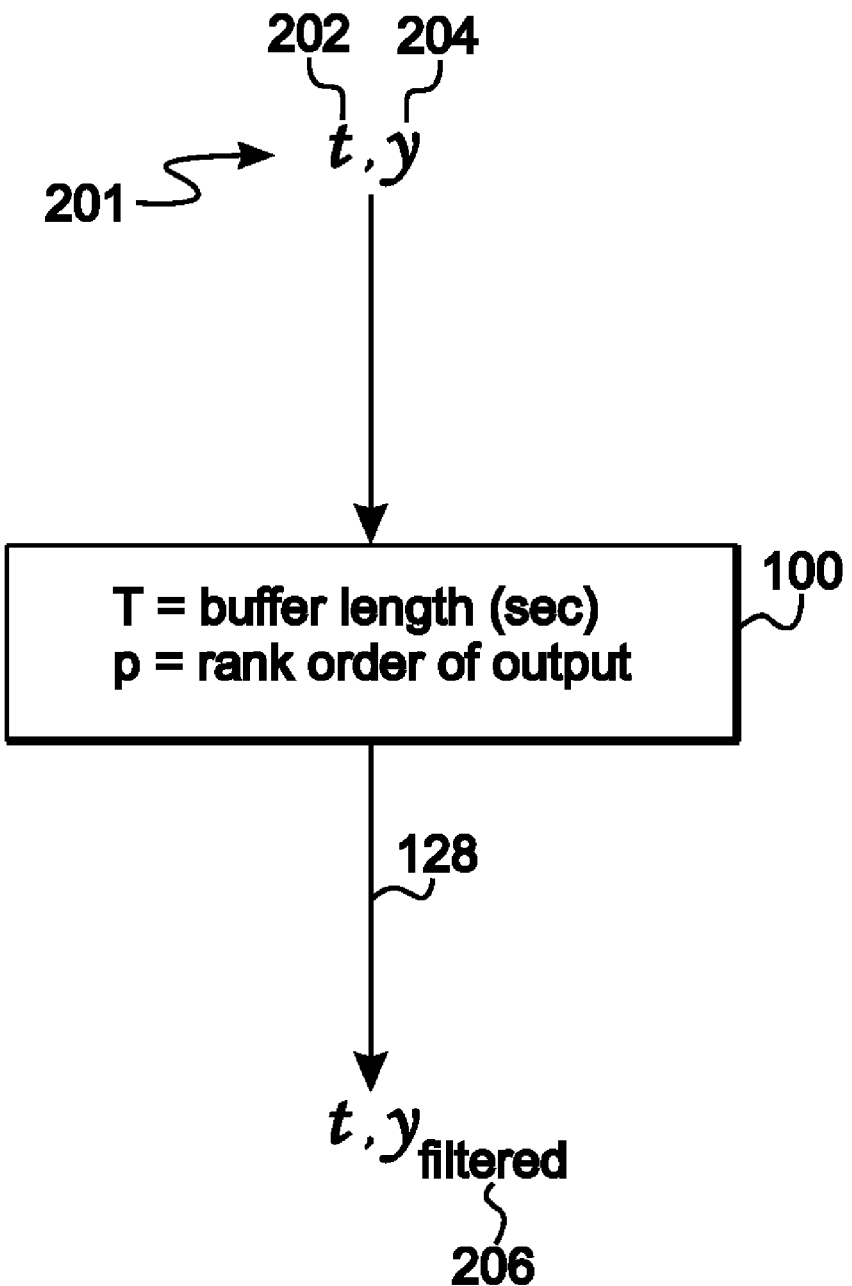
FIG. 2 is representative block diagram of an interface and definition of a rank order filter according to the present teachings.

With specific reference to FIG. 2 of the drawings, there is shown a block diagram of the digital rank order filter 100 according to the present teachings in which the rank order filter 100 is defined by a buffer length, T, in units of time and a rank order vector, p having length j. A specific case where p=0.5 is also known in the art as a median filter. The rank order filter 100, accepts data points 201 represented by time stamp, t 202, and a corresponding value, y 204. In a specific embodiment, the data points 201 are measured at non-uniform time intervals and are accepted into the digital filter 100 as the data points 201 are measured. In another embodiment, the data points 201 are collected and stored in a data file, in which case, the digital filter 100 operates on the data file. The output of the digital filter 100 is the filtered vector, yfiltered 206, that corresponds to a single filtered value for each of the rank order(s), p. Accordingly, the vector yfiltered is of the same length as the length of rank order vector p.

Digital rank order filtering according to the present teachings calculates the rank order filtered value 206 using data points 201 that fall within a fixed time span, T, adjacent to a filter data point 300. Because the data points 201 are sampled at non-uniform intervals of time, the number of data points 201 falling within the fixed time span varies for each filter data point 300. The present teachings propose filtering the measured data points 201 over a moving fixed time span using measured data points 201 that fall within the filter time span and interpolated beginning and end data values from data points 201 that fall outside the filter time span and adjacent to it.

Figure 3:
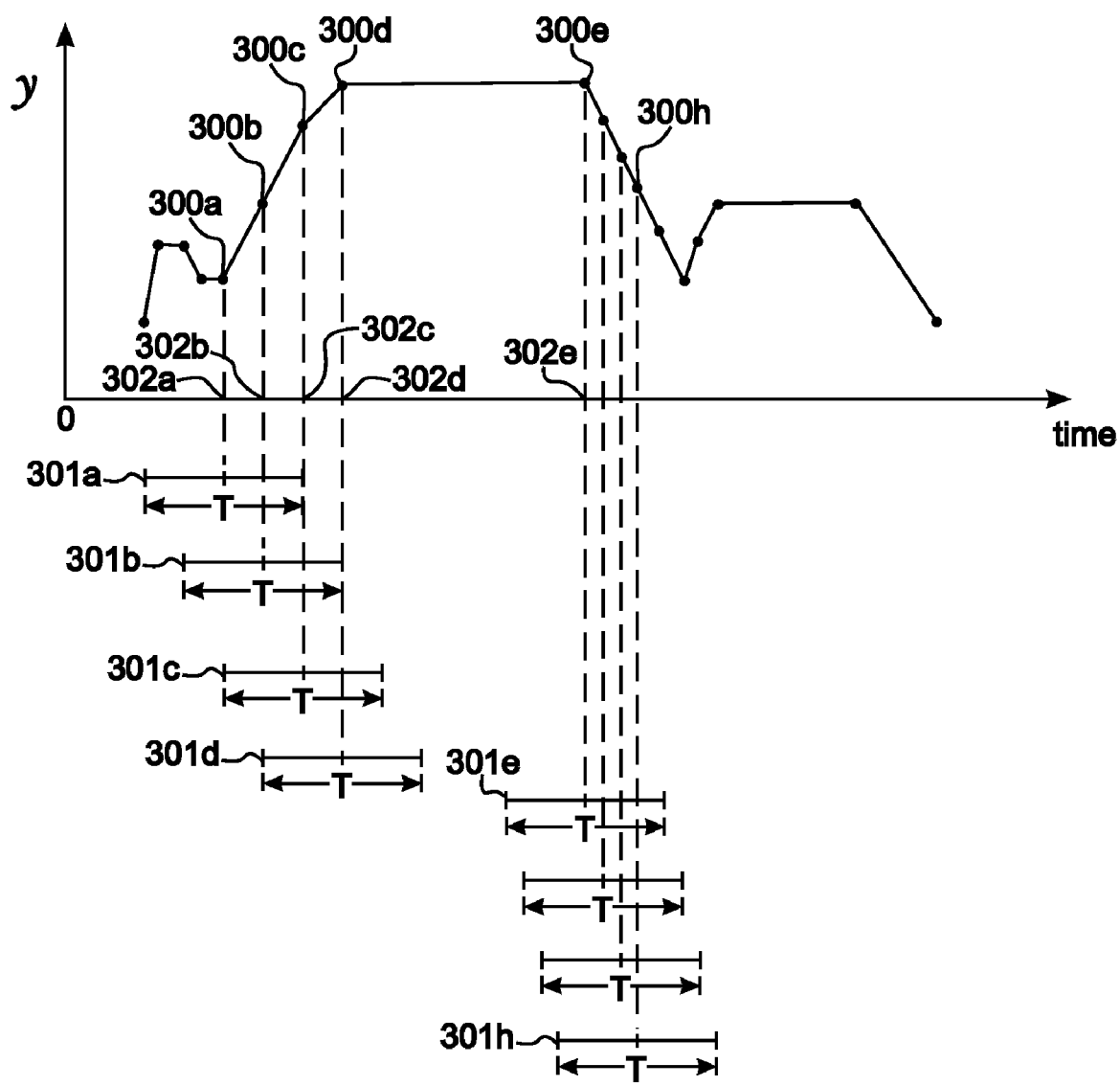
FIG. 3 is a graphical example for purposes of illustration showing data sampled at non-uniform time intervals in relationship to a filter time span and the number of data points it may contain.

With specific reference to FIG. 3 of the drawings, there is shown a graphical representation of data points 201 having non-uniform sampling and their relationship to filter data point 300 and a time span, T, over which the data is filtered. The filter data point 300 is typically associated with the data point 201 centered over the filter time span, T. In alternative embodiments not shown, the filter data point 300 may also be left or right justified within filter time span T. The data points 201 in the graph of FIG. 3 are shown with a piecewise linear interpolation curve fit. Piecewise continuous, piecewise quadratic or any other curve fitting interpolation may also be used in a filter according to the present teachings.

Figure 4:
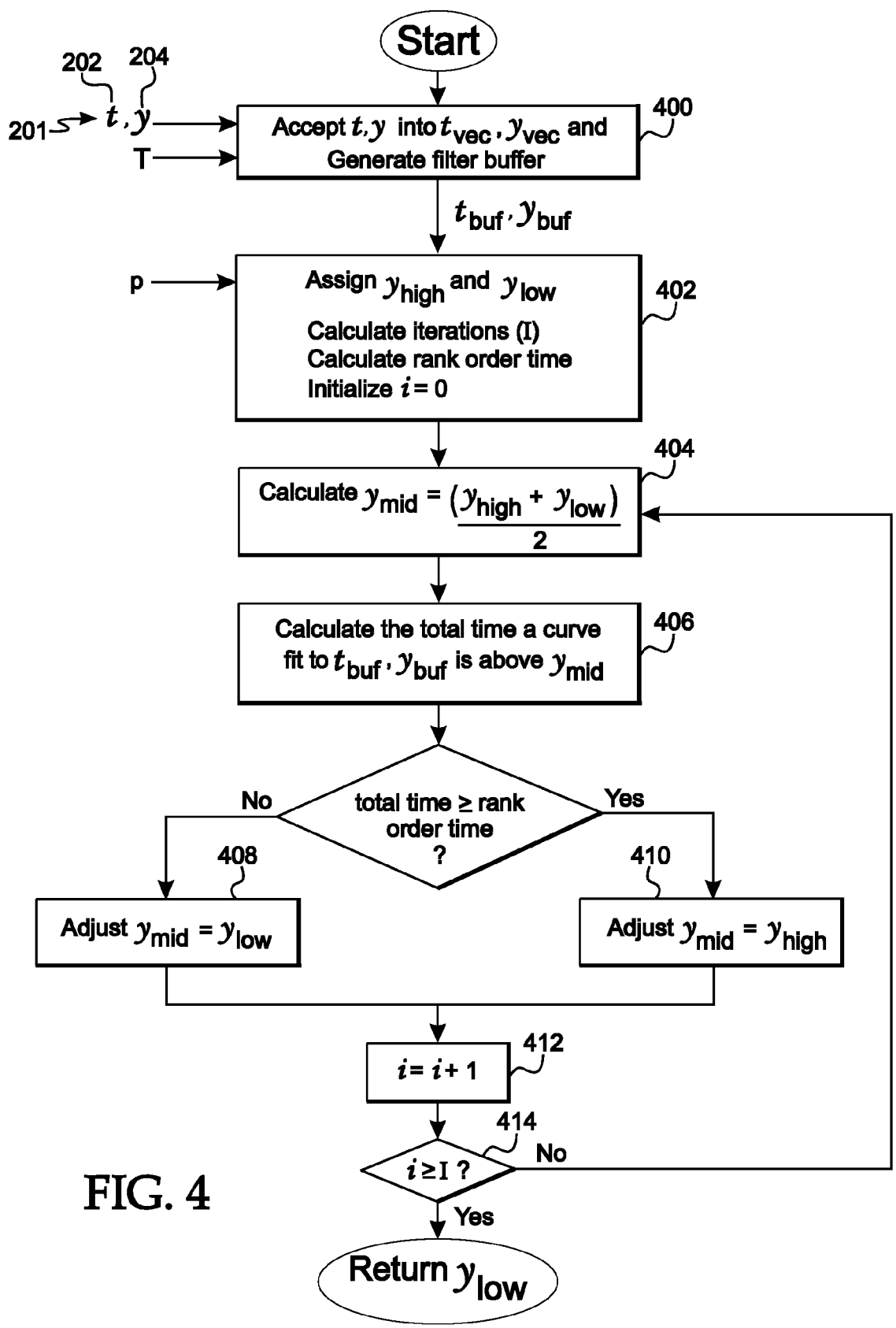
FIG. 4 is a flow chart of an embodiment of a process that implements a rank order filter according to the present teachings.

With specific reference to FIG. 4 of the drawings, a first step in a filter process according to the present teachings, accepts 400 the data points 201 and generates a filter buffer 301 containing the data points 201 to be used in the rank order filter calculation. The filter buffer 301 has a variable length in terms of a number of data points it contains, but has a fixed length in terms of time that it represents. In the illustration of FIG. 3, the filter data point 300 is associated with the time stamp 302a of the data point centered in the filter buffer 301. As the filtered value 206 is output from the filter 100, the filter buffer 301 progresses to the next filter data point 300 and a new filter value 206 is calculated and output.

To illustrate a filter buffer generation operation according to the present teachings and with reference to FIG. 3 of the drawings, assume filter data point 300a is centered over a filter time span of length T seconds. The filter buffer 301a to be generated in preparation for the rank order calculation is centered at filter data point 300a and extends T/2 back in time and T/2 forward in time from the filter data point 300. As one of ordinary skill in the art appreciates, non-uniform sampled data may, but rarely has a measured data point 201 at the beginning and end of a fixed length filter buffer 301. Accordingly, the beginning and end points of the filter buffer 301a are interpolated as necessary according to a specified curve fitting algorithm to generate the complete filter buffer 301a in preparation for the filter calculation. Upon completion of the rank order calculation, the filter data point 300 advances to the next data point 201 to establish a new filter data point 300b and a new filter buffer 301b.

With specific reference to FIG. 4 of the drawings, there is shown a flow chart of a specific embodiment of a process for calculating a rank order filter value according to the present teachings in which data points t and y 201 are accepted into vectors tvec and yvec and the filter buffer 301 is generated 400 for a time span, T, based upon the received data points 201 ±T/2 relative to the filter data point 300. The generated filter buffer 301 is represented as vectors tbuf and ybuf. In a specific embodiment, the same index for the separate single dimensional vectors, tbuf and ybuf, identify each element as a data point pair 201. In another embodiment, the data points 201 may be kept in a two dimensional vector where one of the dimensions represents the time stamp and the other dimension represents the value associated with the time stamp.

From the data values in ybuf, two vectors, yhigh and ylow, are created 402 having a length equal to the length of the rank order vector, p, and all elements are assigned to the maximum and minimum values of the ybuf vector, respectively. In a specific embodiment, a rank order time vector, rotvec, is also calculated to be the product of the rank order, p, and the buffer time span, T. Another embodiment does not calculate the rank order time vector and performs calculations throughout the process based upon a proportion of the time span. The number of iterations to find the rank order value is also calculated and a counting index, i, is initialized to zero.

A number of process iterations to arrive at the filtered value is calculated based upon a minimum desired relative accuracy of the filtered data 206. In a specific embodiment, the number of iterations, I, is calculated as:

$$I = \text{ceil}(-\log(\text{relative\_accuracy})/(\log(2))) \quad (1)$$

As one of ordinary skill in the art appreciates from a reading of the present Specification, the filtered value 206 is approximated using an iterative binary search. Accordingly, the error associated with a result of the binary search is halved at each iteration permitting a direct calculation of the number of iterations to approach a maximum possible error.

An iterative loop begins by calculating 404 a ymid vector to be the midpoint between the yhigh and ylow values. The process then calculates 406 a total time that a curve fit to ybuf is above the ymid value for each rank order value, p. For each element in the total time vector, if the total time is greater than or equal to the rank order time, the corresponding ymid value is adjusted 408 to the ylow value, and if the total time is not greater than or equal to the rank order time, the corresponding ymid value is adjusted 410 to the yhigh value. The local iterative index, i, is incremented 412 and checked 414 against the total number of desired iterations, I. A next iteration re-calculates 404 the ymid vector before re-calculating 406 the total time a curve fit to ybuf is above ymid. As one of ordinary skill in the art appreciates, each iteration is a step in a binary search for the desired rank order value. Accordingly, when the number of iterations has been processed, the ylow value is the rank order value within the desired relative accuracy and represents the rank order value result of the rank order filter 100. Accordingly, the ylow vector is output as the rank order yfiltered 206 values.

Figure 5:
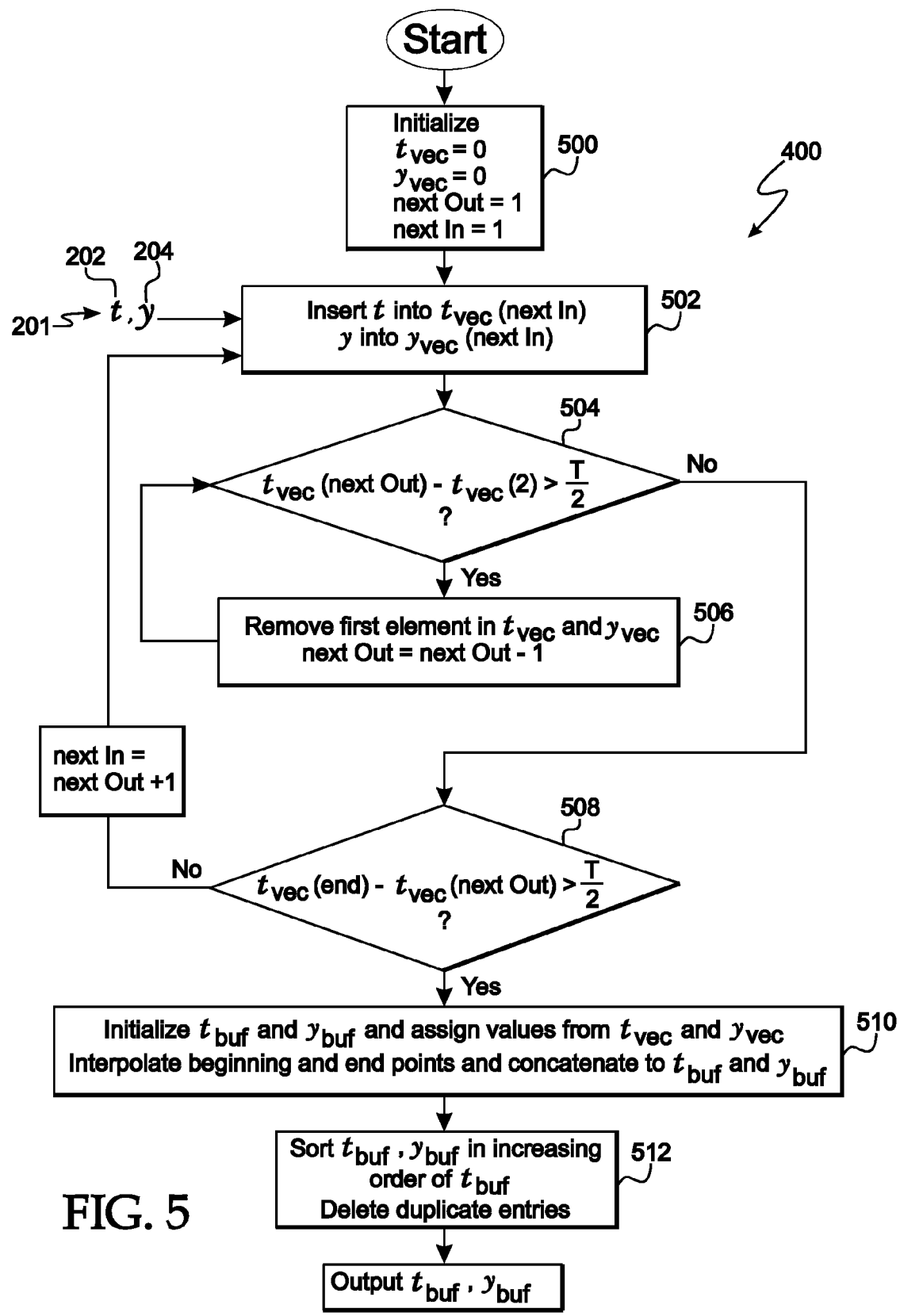
FIG. 5 is a flow chart of an embodiment of a buffer filter generation process suitable for use in a process according to the present teachings.

With specific reference to FIG. 5 of the drawings, there is shown a flow chart illustrating additional detail representing a specific embodiment of the filter buffer generation process 400 suitable for use in a process according to the present teachings in which first in first out (herein "FIFO") vectors tvec and yvec are initialized 500 to be a size to accommodate a maximum number of data points 201 that can fall within the filter buffer time span, T. A NextOut index representing an index into the tvec and and yvec vectors that represents the filter data point 300 and a NextIn index representing the index into which the next data point 201 is stored into tvec and yvec, respectively are initialized to one.

As each new data point 201 is accepted into the FIFO buffers, tvec and yvec, the time value of the NextOut data point is checked 504 against the second oldest data point within the FIFO buffer. If the second oldest data point received is greater than half of the filter time span, T/2, relative to the filter data point 300 as represented by tvec(NextOut), then the first element of the tvec and yvec vectors is no longer relevant to the rank order filter process and they are discarded 506. The indices of the FIFO buffers are adjusted to accommodate the loss of the oldest data point and the NextOut index is decremented 506 by 1 to maintain consistency with the FIFO buffer indices. Computations 504 and 506 thus ensure that old data are removed from the FIFO as soon as they are known to be no longer needed for future computations, thus conserving FIFO memory.

As each data point 201 is accepted and inserted into the FIFO buffers, the process 400 determines 508 if there are sufficient data points 201 in the FIFO buffers, tvec and yvec, to represent at least the filter time span, T, centered over the filter data point 300. The determination is made by subtracting the time stamp of the last data point tvec(nextIn) received from the time stamp of the filter data point 300. If there is enough time represented in the FIFO buffers, the tbuf and ybuf vectors are set equal to the current elements stored in the tvec and yvec vectors. The tbuf and ybuf vectors are then concatenated 510 with beginning and ending data points. The beginning data point is interpolated for the time value of tvec(NextOut)−T/2 by linearly interpolating between yvec(1) and yvec(2). Similarly, the ending data point is interpolated for the time value of tvec(NextOut)+T/2 by linearly interpolating between yvec(end-1) and yvec(end-2). Here, for convenience, the notation as been adopted where for any vector z, z(end) is the last element of the vector, z(end-1) is the penultimate element, z(end-2) is the peripenultimate element, and so forth. The resulting tbuf and ybuf vectors are then sorted 512 in increasing time and any duplicate entries are deleted. The sort and conditional delete step is for the purpose of deleting an interpolated data point generated when a measured data point for the same time is available. Alternatively, the sort and conditional delete step 512 may be obviated by making the interpolation and concatenation step 510 conditioned on the absence of a measured data point at the −T/2 and +T/2 positions in time. The result of the filter buffer generation process 400 is the tbuf and ybuf vectors.

Figure 6:
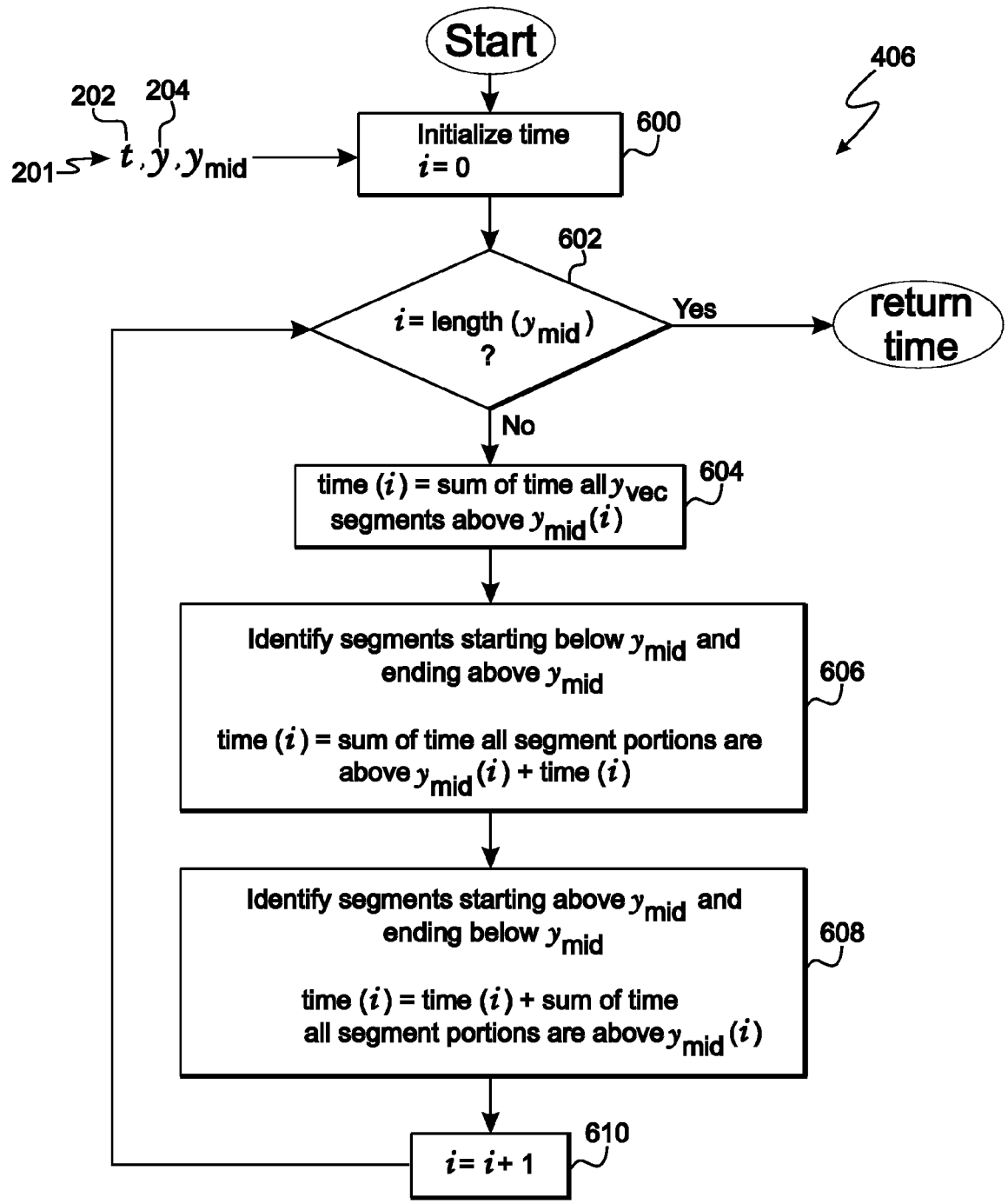
FIG. 6 is a flow chart of an embodiment of a time calculation process suitable for use in a process according to the present teachings.

With specific reference to FIG. 6 of the drawings, there is shown a flow chart of an embodiment of the process 406 for calculating an amount of time a curve is above a voltage level according to the present teachings in which a function is passed two vectors, t and y, containing data points that define the curve and vector, ymid, representing those voltage values for which the time above is to be calculated. The process 406 begins by initializing 600 a vector, time, having a length equal to the length of the ymid vector and setting a local iteration index, i, to zero. In the specific embodiment illustrated, a total time calculation is made for each value in the ymid vector. In an alternative embodiment, the calculation can be made and returned as a proportional or percentage value. The iteration index, i, is checked 602 against the length of the ymid vector and if additional calculations are indicated, the process identifies 604 all segments of the curve defined by t and y that are entirely above the ymid(i) value and sums the time represented by the identified segments into the time(i) value. The process then identifies 606 all segments of the curve that begin less than ymid(i) and end greater than ymid(i). For each of the identified segments, the portion of the time the segment is above the ymid(i) value is added to the time(i) value. The process then identifies 608 all segments of the curve that begin greater than ymid(i) and end less than ymid(i). For each of the identified segments, the portion of the time the segment is above the ymid(i) value is added to the time(i) value. When the time(i) value is computed, the iteration index, i, is incremented and the process repeats by checking the iteration index, i, against the length of the ymid vector.

The segments are identified by collecting those indices pointing to values represented by the t and x vectors that satisfy the criteria relative to ymid. The specific equations used for calculation of the portion of time for identified segments that start either above or below ymid and end either below or above ymid depends upon the type of interpolation selected for the curve defined by the time stamped data points. Any curve fit interpolation is appropriate including without limitation piecewise continuous, piecewise linear, piecewise quadratic, piecewise cubic, polynomial splines of any order, or band limited interpolation. In a specific example of a piecewise linear interpolation, the calculation for segments that begin less than ymid and end greater than ymid may be:

$$\text{time}(i) = \text{time}(i) + \frac{y(j+1) - ymid(i)}{y(j+1) - y(j)}(t(j+1) - t(j)) \qquad (2)$$

Wherein j and j+1 are indices that define one or multiple segments identified in the calculation. Similarly, the calculation for segments that begin greater than ymid and end less than ymid may be:

$$\text{time}(i) = \text{time}(i) + \frac{y(j+1) - ymid(i)}{y(j) - y(j+1)}(t(j+1) - t(j)) \qquad (3)$$

Wherein j and j+1 are indices that define one or multiple segments identified in the calculation.

Figure 7:
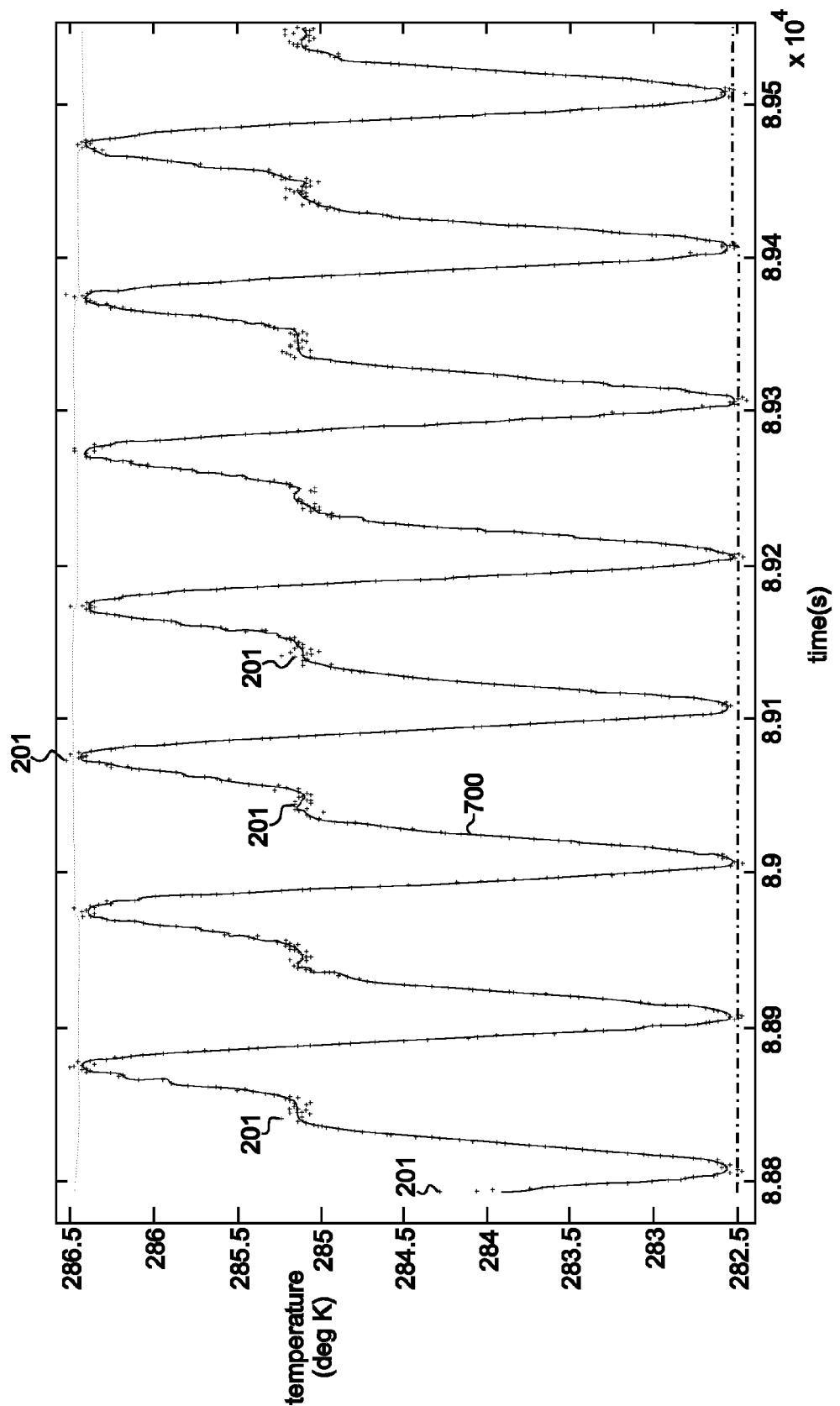
FIG. 7 is a graphical representation of measured data and a rank order filtered output of the measured data.

With specific reference to FIG. 7 of the drawings, there is shown a example of the data points 201 plotted on a graph of amplitude vs. time and the filtered result according to the present teachings. Each data point 201 is represented in the graph with a "+". The filtered result 700 is shown as a curve superimposed on the data points 201.

Embodiments of the teachings are described herein by way of example with reference to the accompanying drawings describing an embodiment of a rank order filter suitable for use on data sampled at non-uniform time intervals. Other variations, adaptations, and embodiments of the present teachings will occur to those of ordinary skill in the art given benefit of the present teachings.

The invention claimed is:

1. A method of rank order filtering comprising:
   Within a controller implementing a plurality of instructions,
   Accepting a rank order,
   Accepting into a buffer of the controller, data points to be filtered, each data point comprising a data value and an associated time stamp until the buffer contains data points representing a minimum predefined time span,
   Calculating an amount of time the data values in the buffer are above an approximate filter value,
   Adjusting the approximate filter value based upon the relationship of the amount of time to the rank order,
   Repeating the steps of accepting data points to be filtered, calculating and adjusting, and
   Outputting the approximate filter value.

2. A method as recited in claim 1 and further comprising, within the controller implementing a plurality of instructions, converting the rank order into a rank order time length wherein the step of adjusting is based upon the relationship between the amount of time and the rank order time length.

3. The method of claim 2 wherein the rank order time length is calculated as a product of the buffer time span and the rank order.

4. A method as recited in claim 1 and further comprising, within the controller implementing a plurality of instructions, interpolating a time stamp and a data value for the beginning and end of the buffer to cause the buffer to be equal to the predefined time span.

5. A method as recited in claim 4 wherein the approximate filter value is associated with a data point at a center of the buffer.

6. A method as recited in claim 1 and further comprising, within the controller implementing a plurality of instructions, removing an oldest data point in the buffer and repeating the steps of accepting data points to be filtered, calculating, adjusting, repeating and outputting for new data in the buffer.

7. A method as recited in claim 1 wherein the step of accepting data points to be filtered further comprises measuring and time stamping the data points prior to accepting the data points into the buffer.

8. The method of claim 7 wherein the data points are measured at non-uniform time intervals.

9. A method as recited in claim 1 and further comprising, within the controller implementing a plurality of instructions, fitting the data points to a curve as part of the step of calculating.

10. A method as recited in claim 9 wherein the step of fitting uses a piecewise linear approximation.

11. A method as recited in claim 9 wherein the step of fitting uses a piecewise continuous approximation.

12. A method as recited in claim 9 wherein the step of fitting uses a quadratic approximation.

13. A method as recited in claim 1 wherein the rank order is a vector of rank orders.

14. A method as recited in claim 1 wherein the approximate filter value is initialized to be the midpoint between the maximum data value in the buffer and the minimum data value in the buffer.

15. A method as recited in claim 1 wherein minimum and maximum data values of the data points in the buffer are established and adjusting further comprises identifying whether the amount of time is less than the rank order time length, resetting the minimum data value to the approximate filter value if the rank order time length is greater or equal to the amount of time, resetting the maximum data value to the approximate filter value if the rank order time length is less than the amount of time, and recalculating the approximate filter value to equal a value midway between the minimum and maximum data values.

16. The method of claim 1 wherein the step of repeating occurs a number of times equal to the next highest integer value of negative the natural log of the desired relative accuracy.

17. The method of claim 1 wherein the buffer is a first in first out (FIFO) buffer.

18. A rank order filter comprising:
   A processor configured to accept data points into a buffer, each data point comprising a data value and an associated time stamp and representing data collected at non-uniform time intervals, until the buffer represents a minimum predefined time span,
   A rank order filter defined by a rank order and a buffer time span, the filter iteratively identifying a rank order data value wherein the data points in the buffer define a curve that is above the rank order data value a proportion of the buffer time span defined by the rank order, and
   A filtered data value output.

19. A rank order filter as recited in claim 18, the processor further configured to interpolate data points at the beginning and end of the buffer to cause the buffer to equal the predefined time span.

20. A rank order filter as recited in claim 18, wherein the rank order filter is defined by at least two rank order data values.

21. A rank order filter as recited in claim 18, the buffer having a variable length.

22. A rank order filter as recited in claim 18, the buffer being a first in first out (FIFO) memory buffer.

23. A rank order filter as recited in claim 18 wherein the proportion of the buffer time span defined by the rank order is a product of the buffer time span and the rank order.

24. A rank order filter as recited in claim 18 wherein the curve is a piecewise continuous approximation.

25. A rank order filter as recited in claim 18 wherein the curve is a piecewise linear approximation.

* * * * *

UNITED STATES PATENT AND TRADEMARK OFFICE
CERTIFICATE OF CORRECTION

PATENT NO.        : 7,864,711 B2                                              Page 1 of 1
APPLICATION NO.   : 11/688582
DATED             : January 4, 2011
INVENTOR(S)       : Lee A. Barford It is certified that error appears in the above-identified patent and that said Letters Patent is hereby corrected as shown below:

In column 7, line 30, in Claim 2, delete "length" and insert -- length, --, therefor.

Signed and Sealed this
Fifth Day of April, 2011

David J. Kappos
*Director of the United States Patent and Trademark Office*